United States Patent [19]

Rogers

[11] Patent Number: 4,583,992
[45] Date of Patent: Apr. 22, 1986

[54] BIOMASS GASIFIER AND CHARCOAL PRODUCER

[75] Inventor: Chester D. Rogers, Olathe, Kans.

[73] Assignee: Buck Rogers Mfg. Co., Inc., Industrial Airport, Kans.

[21] Appl. No.: 678,178

[22] Filed: Dec. 4, 1984

[51] Int. Cl.$^4$ .............................................. C10J 3/42
[52] U.S. Cl. ......................................... 48/76; 48/66; 48/85.2; 48/111
[58] Field of Search .................... 48/66, 76, 111, 85.2

[56] References Cited

U.S. PATENT DOCUMENTS

| | | |
|---|---|---|
| 718,887 | 1/1903 | Talbot . |
| 753,340 | 3/1904 | Wight et al. . |
| 1,025,192 | 5/1912 | Jefferies et al. . |
| 1,060,807 | 5/1913 | Akerlund . |
| 1,822,885 | 9/1931 | Crosby . |
| 2,185,077 | 12/1939 | Galasha .............................. 48/66 |
| 2,200,066 | 5/1940 | Koller . |
| 3,729,298 | 4/1973 | Anderson . |
| 3,746,521 | 7/1973 | Giddings . |
| 4,004,986 | 1/1977 | Franzer et al. . |
| 4,030,895 | 6/1977 | Caughey . |
| 4,057,396 | 11/1977 | Matovich . |
| 4,137,051 | 1/1979 | Godwin .............................. 48/66 |
| 4,142,867 | 3/1979 | Kiener . |
| 4,268,274 | 5/1981 | Caughey . |
| 4,268,275 | 5/1981 | Chittick . |
| 4,306,506 | 12/1981 | Rottner . |

FOREIGN PATENT DOCUMENTS

| | | |
|---|---|---|
| 592608 | 2/1934 | Fed. Rep. of Germany . |
| 664136 | 8/1929 | France . |
| 702664 | 4/1931 | France . |

*Primary Examiner*—Peter Kratz
*Attorney, Agent, or Firm*—Schmidt, Johnson, Hovey & Williams

[57] ABSTRACT

An upright, cylindrical down draft gasifier has a rotatable grate which supports a quantity of pyrolyzing biomass materials. As the grate is turned, charcoal particles thus formed fall through apertures in the grate and into a collection chamber. Simultaneously a high quality combustible gas is continuously withdrawn. A number of stationary, horizontal rods are disposed above the grate to retard and mix the reactant in the column and force a portion of the charcoal particles through the apertures. Additionally, the rods, in conjunction with the grate, present a shearing action on larger charcoal particles until the latter are crumbled and consequently fall through the grate. As the speed of the rotable grate is increased, the quantity of combustible gas and high quality charcoal is enhanced such that the heating value of the final product is also greatly increased.

13 Claims, 14 Drawing Figures

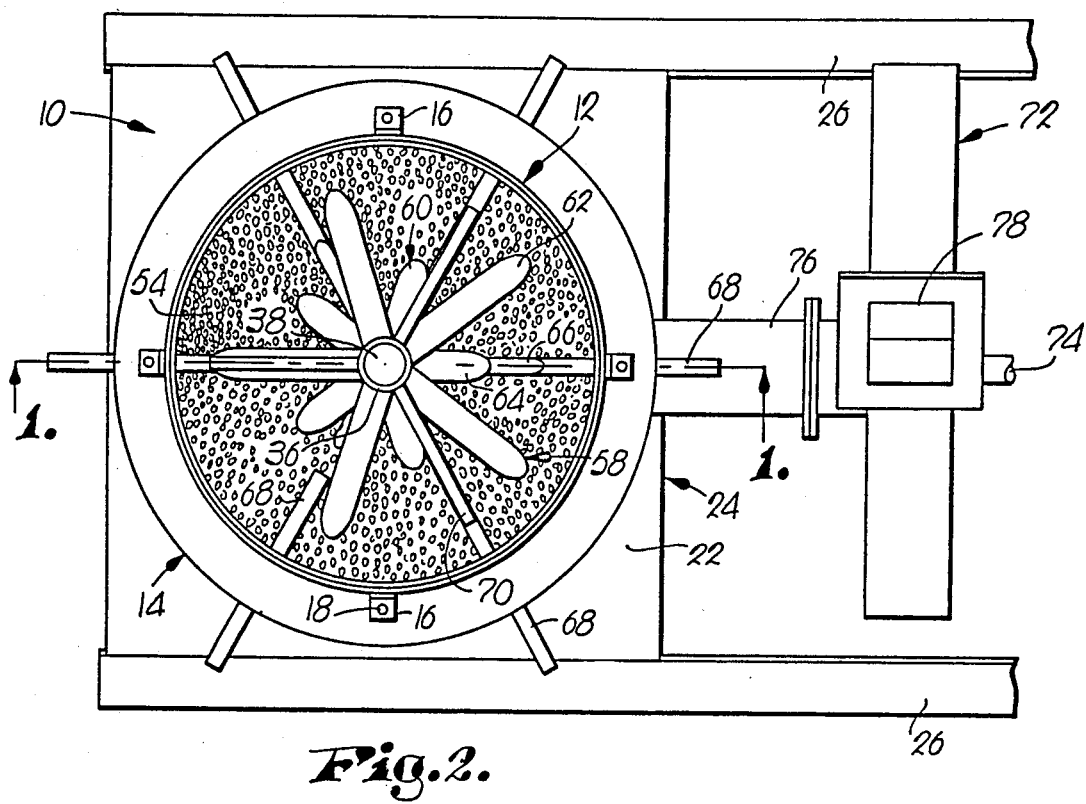

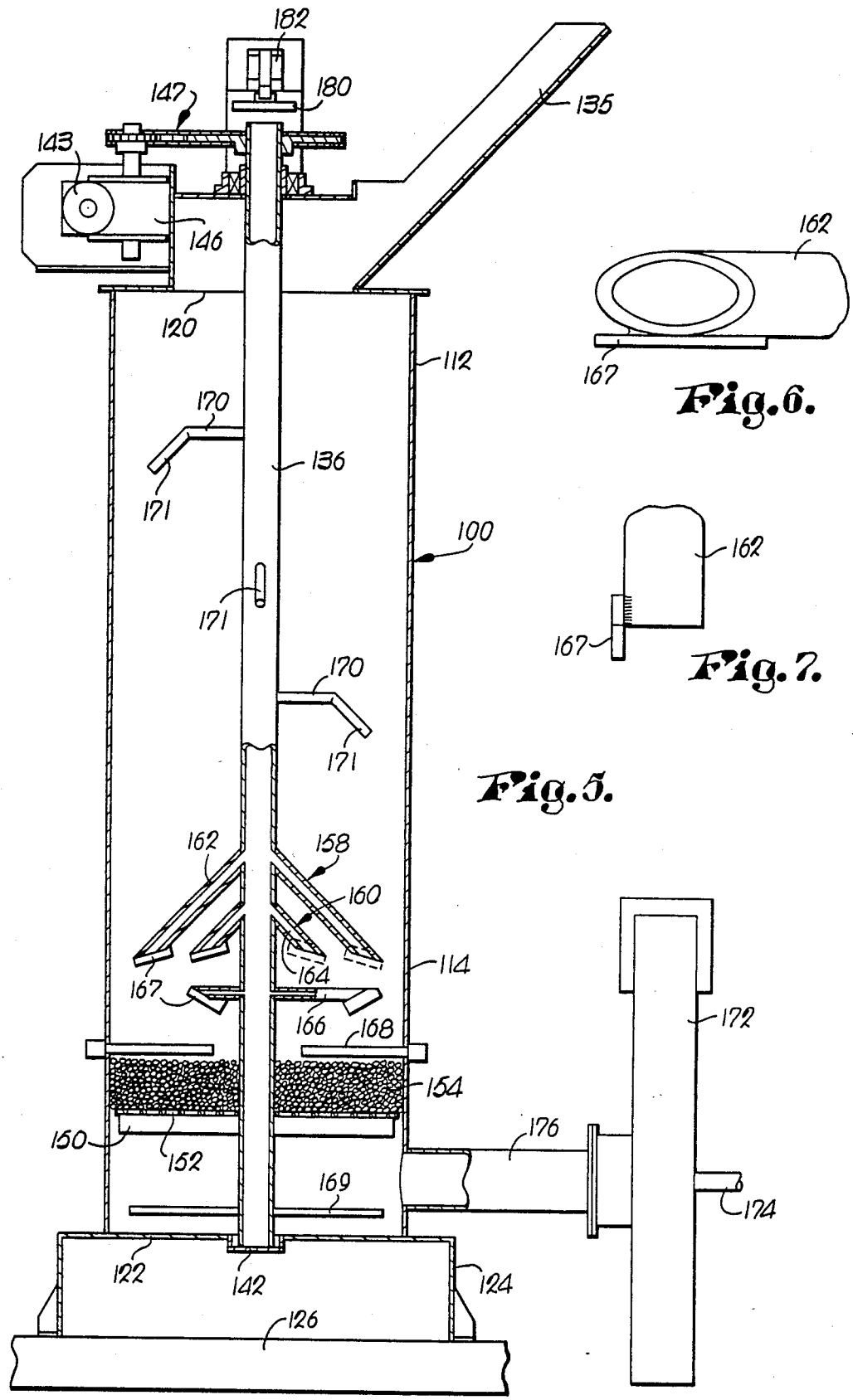

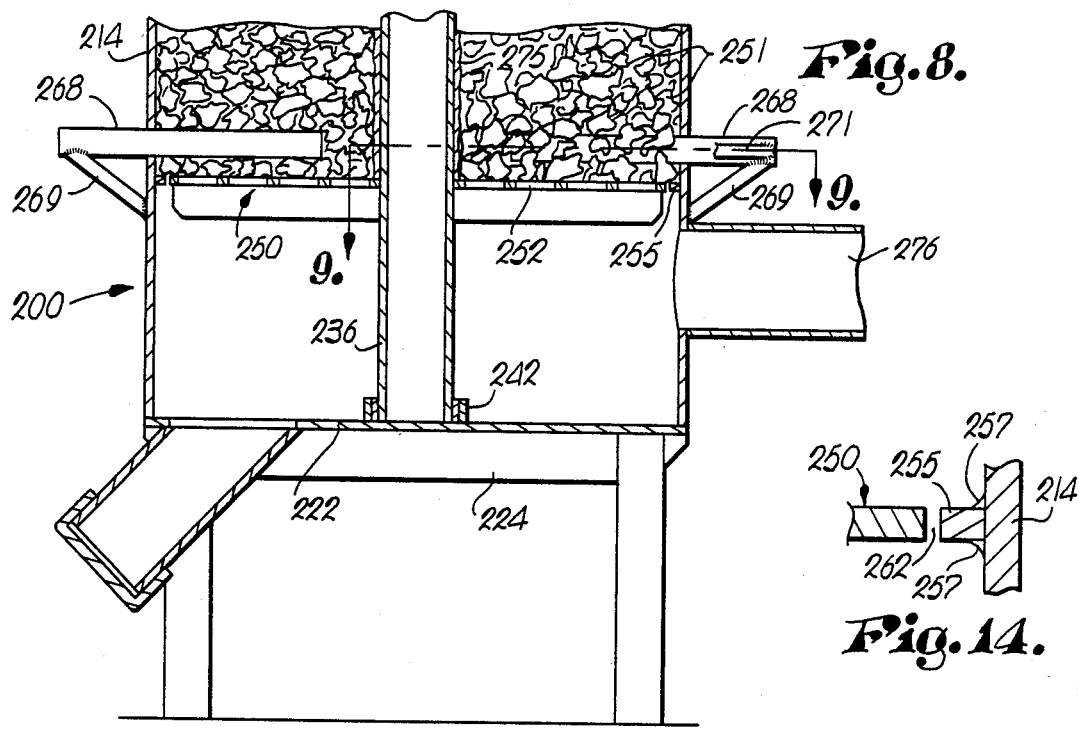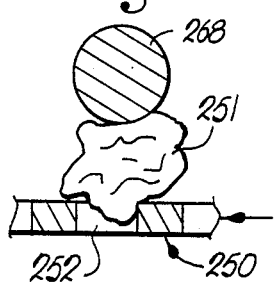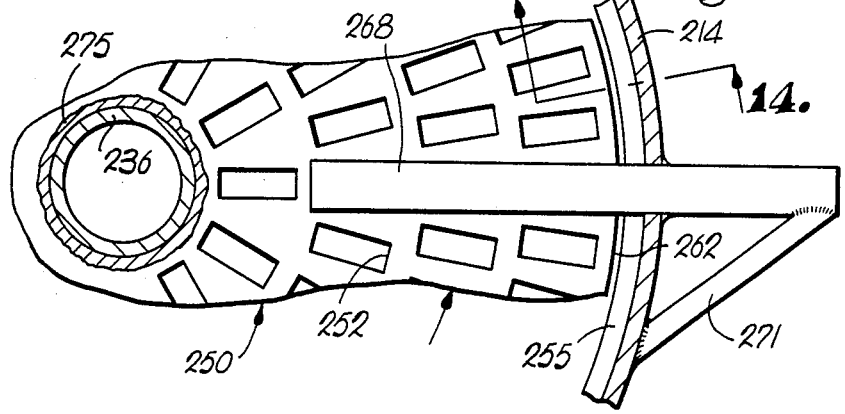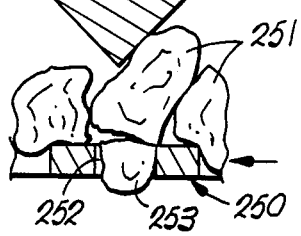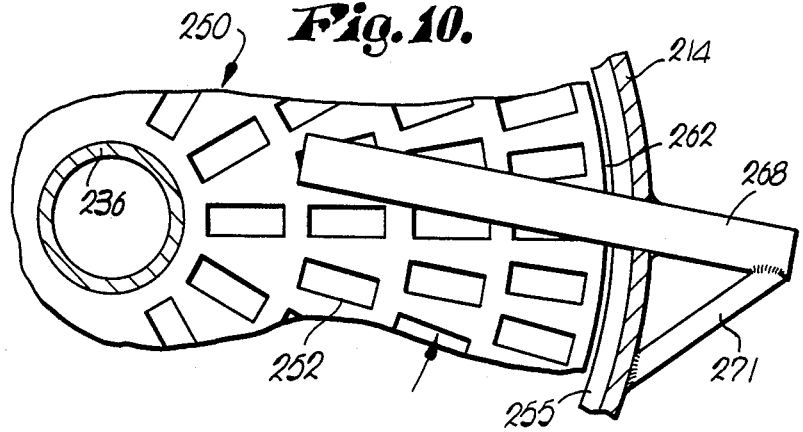

BIOMASS GASIFIER AND CHARCOAL PRODUCER

The present invention is directed toward an improved biomass gasifier which produces both charcoal and combustible gas. This application is related to a copending application for U.S. Letters Patent, Ser. No. 611,841, filed May 18, 1984 now abandoned.

In the copending application, it is recognized that a rotating platform or grate within an upright cylindrical gasifier can advantageously support a number of ball-like elements which in turn support the reacting char-bed. As the grate is turned, the heat resistant balls are joggled and displaced such that the pyrolytic reaction time is substantially reduced and the quality of the recovered gas is appreciably enhanced. The balls break the char-bed into hot, partially burned particles which sift downwardly through the ball layer and into a collection chamber below the grate.

The price of and demand for charcoal in the market has increased to a point where the charcoal, in some instances, may be more valuable than the combustible gas. However, the ball layer as disclosed in the related application somewhat hinders the recovery of charcoal since the latter is substantially crumbled during its downward filtration through the balls. Furthermore, the ball layer increases the residence time of the charcoal within the pyrolyzing zone above the grate such that the charcoal is unnecessarily detained and partially combusted. Additionally, the ball-like elements are expensive and subject to breakage and other maintenance problems.

Therefore, by generally following the same basic principles and concepts as disclosed in the above mentioned copending application, I have discovered that the cylindrical gasifier may be modified to yield a high percentage of charcoal. The ball layer has been completely eliminated such that the reacting char-bed is supported entirely by the rotating grate, thereby eliminating the unnecessary disintegration and lengthy detention of the charcoal particles before gravitational entry into the collection chamber. Consequently, hourly throughput of the biomass materials is greatly increased.

Additionally, a number of stationary, horizontal rods are disposed but a very slight distance above the rotating grate such that the rods retard the rotation of the char-bed and force the particles to go either above or below the rods. This stirring action enhances the pyrolytic reaction and additionally forces the ground away particles downwardly through the apertures in the grate. Simultaneously, the rods present a shearing action, chiefly on oversized particles, tending to break up the latter for ultimate descent through the grate. Preferably, the rods have a leading edge to enhance the shearing force.

As a result, the gasifier can produce large quantities of charcoal as well as a high BTU gas simultaneously such that the heating value of the final products may be as large as 110 percent of the heating value of the raw biomass material. As an example, the gasifier as disclosed herein can produce a quantity of valuable charcoal and combustible gas with a heating value of over 7,000 BTUs when only one pound of raw biomass is introduced into the gasifier. Obviously, such a significant advance in the art will considerably decrease our ever-increasing dependence on oil, coal and other non-renewable resources.

BRIEF DESCRIPTION OF THE DRAWINGS

FIG. 1 is a cross-sectional view of a biomass gasifier made in accordance with one embodiment of the related co-pending application for U.S. Letters Patent, Ser. No. 611,841, filed May 18, 1984;

FIG. 2 is a top plan view thereof;

FIGS. 3 and 4 are cross-sectional views taken on line 3—3 and 4—4 respectively of FIG. 1;

FIG. 5 is a view similar to FIG. 1 showing another embodiment of the above-referenced co-pending application;

FIG. 6 is an enlarged, fragmentary view showing the discharge end of the tuyeres illustrated in FIG. 5;

FIG. 7 is another view of the construction shown in FIG. 6;

FIG. 8 is a fragmentary view similar to FIG. 1 showing the embodiment of the instant invention;

FIG. 9 is an enlarged, fragmentary, cross-sectional view taken along line 9—9 of FIG. 8;

FIG. 10 is a view similar to FIG. 9 illustrating another form of the instant invention;

FIG. 11 is an enlarged, fragmentary, detailed, cross-sectional view showing the interaction of the rod and the grate upon a charcoal particle;

FIG. 12 is a view similar to FIG. 11 wherein the rod has a square transverse configuration;

FIG. 13 is another view similar to FIG. 11 wherein the rod has a triangular transverse configuration; and FIG. 14 is a detailed, cross-sectional view still further enlarged taken along line 14—14 of FIG. 9.

DETAILED DESCRIPTION

Figures 1, 4:
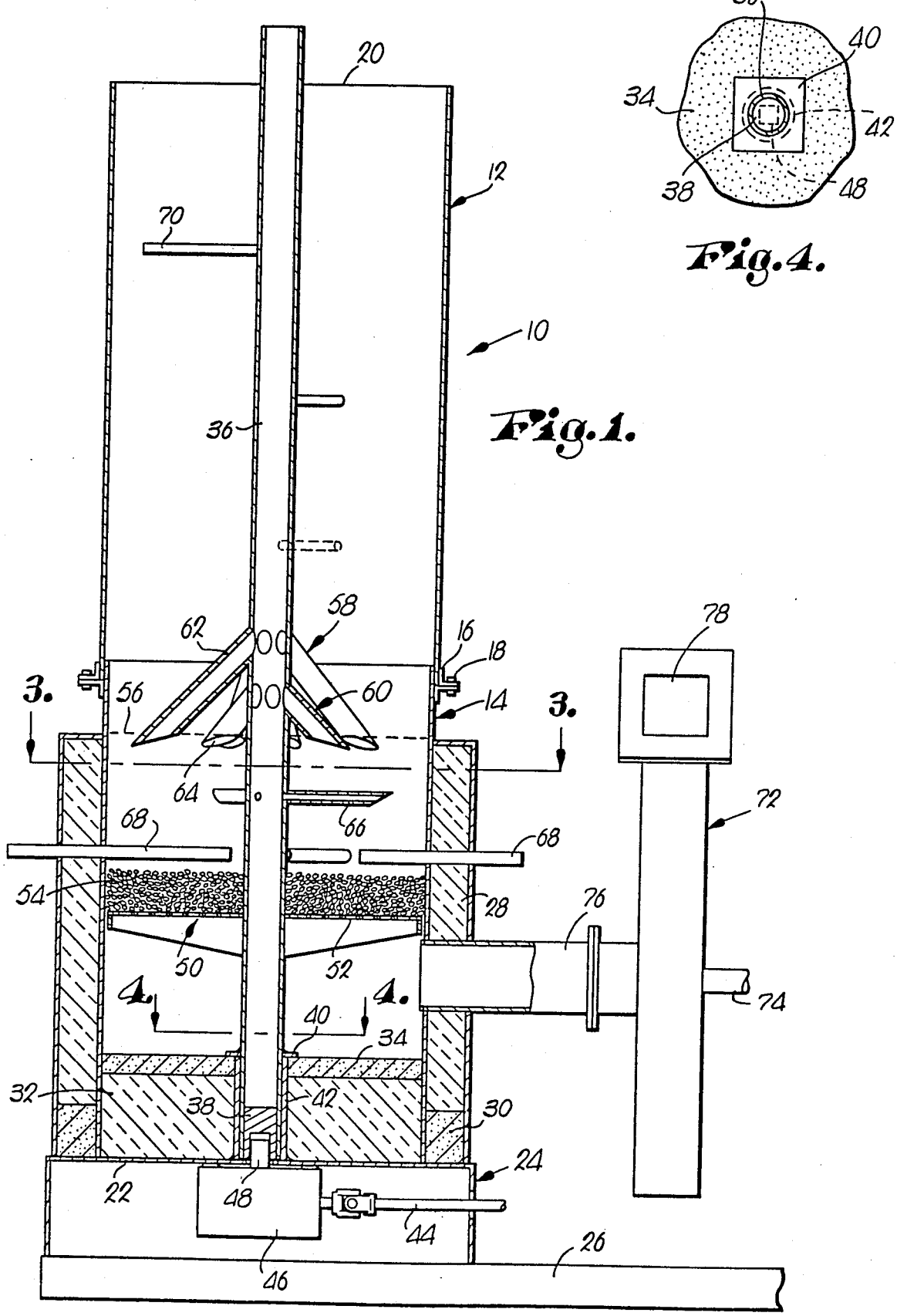

FIGS. 1-4 illustrate a gasifier 10 as disclosed in said related application including a hollow gas generator having an upper and a lower tubular section 12 and 14 respectively, relatively telescoped and interconnected by a series of flanges 16 coupled together through use of releasable fasteners 18. The selection 12 has an open top 20 for receiving air and biomass materials, and the section 14 is closed by an upper plate 22 of a hollow base 24 resting on a pair of beams 26.

The section 14 is substantially of double wall construction for receiving outer insulation 28 overlying outer insulating material, such as sand 30, supported by the plate 22. Insulation 32 is also supported by the plate 22 within the section 14, together with said 34 or the like overlying the insulation 32.

The open top 20 of the section 12 is adapted to receive a constant supply of biomass materials (not shown) for confinement in a column by the section 12, and an elongated, rotatable, upright (preferably vertical) combination stirrer and downdraft air supply pipe 36 in the generator 10 (preferably coaxial therewith) is open to the atmosphere at its uppermost end above the biomass materials in the generator 10. The pipe 36 has a socketed plug 38 resting on the plate 22 and a flange 40 resting on a collar 42 secured to the plate 22 and surrounding the pipe 36 within the insulating materials 32 and 34.

The pipe 36 is rotated by a prime mover (not shown) through a shaft 44 extending into a gear box 46 within the base 24, the output of the gears within the box 46 being a rotatable, polygonal stub 48 extending through the plate 22 and mating with the socket in the plug 38.

A grate 50, in the nature of a circular, plate-like, holding platform, provided with a multitude of openings such as slots 52, surrounds the pipe 36 spaced above the insulation 34 and is rigidly secured to the pipe 36 for rotation therewith, the diameter of the grate 50 being less than the inside diameter of the section 14. As noted in FIG. 1, the grate 50 is supported by a number of radial paddles for preventing char build-up below the grate 50. A layer 54 of loose, reaction resistant, discrete (preferably spherical) elements, such as ceramic balls, covers the grate 50. Resting on the layer 54 is a charcoal bed (not shown) of the biomass materials reacting in the section 14, the level 56 of such bed normally reaching no higher than about the upper limits of the insulation 28, depending on the nature of the materials being converted to gas, and many other conditions and circumstances.

Means for directing combustion-supporting air or other fluid from the atmosphere into the charcoal bed includes upper and lower assemblies 58 and 60 respectively of tubular branches or tuyeres, all communicating with and secured to the pipe 36 within the generator 10. The upper assembly 58 includes a top set of such branches 62 and a lower set of branches 64, all extending downwardly and outwardly at an angle from the pipe 36, discharging onto the level 56 or slightly therebelow. Still further, there is provided a row of char reheaters in the nature of air discharge branches 66 within the charcoal bed, communicating with and secured to the pipe 36, all of the branches 62, 64 and 66 being rotatable with the pipe 36.

A plurality of radial rods or stators 68 extending into the generator 10, through the insulation 28 and the walls of the section 14, toward the pipe 36, are disposed above the layer 54 and within the charcoal bed to prevent or retard rotation of such bed by the rotating layer 54. The rods 68 are removable from the outside of the generator 10 to permit lifting and removal of the pipe 36 and its attached parts from the generator 10.

A number of stirring elements 70 for the biomass materials in the section 12 are arranged at different heights and are secured to the pipe 36, radiating therefrom for rotation therewith.

Suction means, such as a centrifugal exhaust fan 72, having an internal vaned rotor (not shown) provided with an input shaft 74, communicates with the section 14 below the grate 50 by means of inlet 76 of the fan 72 which extends through the walls of the section 14 and through the insulation 28 thereof. The fan 72 has for its purpose (a) drawing fluid into and through the charcoal bed from the branches 62, 64 and 66, (b) pulling the fluid through the char-bed and into the layer 54, (c) drawing air downwardly through the biomass in the section 12, and (d) withdrawing generated gas and entrained residue from within the generator 10.

In the event the gas being drawn downwardly through the slots 52 by the fan 72 contains any unburned char, the char-entrained gas may be forced from outlet 78 of the fan 72 into a filter, such as a cyclone separator (not shown), before the clean gas is directed by the fan 72 to a point of use and/or prior cooling.

The section 12 and that portion of the section 14 above the layer 54 become, therefore, a biomass reservoir zone which is, in turn, subdivided into a pyrolyzing zone extending from the lower ends of the assemblies 58 and 60 upwardly to about the upper extremities of the section 14. Immediately below the pyrolyzing zone, the biomass reservoir zone has a relatively shallow air insertion zone well above the char reheaters 66 and thirdly, a char zone exists in the generator 10 between the layer 54 and the air insertion zone.

OPERATION the continuous, gasification process of converting biomass materials into a combustible, gaseous fuel through use of the gasifier 10 and associated equipment above described includes maintenance of the section 12 substantially full of such materials by feeding the same through the open top 20 by any suitable means (not shown). Such materials include wood chips as a prime example, but the term "biomass", as herein used, is intended to also include sawdust, crop residues, industrial wastes and virtually all other burnable substances capable of undergoing chemical reaction above and within the layer 54 and to release and reform combustible gas as the result of such reaction. In the method also, it is necessary or somewhat desirable, for best results, to maintain the materials in the section 12 somewhat loose and against bridging by use of the rotating, stirring or agitating elements 70, depending on such factors as the nature, density, moisture content, ambient haumidity conditions and caking tendency of the biomass materials being used. This enhances free flow of air through the materials to further support exothermic reaction.

The next step is to produce and maintain a charcoal bed between the layer 54 and the level 56 within the section 14, it being anticipated that such bed will react at very high temperatures, at least up to about 1100–1800 degrees Fahrenheit. Manifestly, this is accomplished by continually supplying the bed, by use of the slowly rotating pipe 36 and its branches 62, 64 and 66, with an adequate supply of reaction-supporting fluid such as air from the atmosphere or by feeding oxygen, steam or the like to the upper end of the pipe 36 in the downdraft, negative pressure system. The fact that the branches 62, 64 and 66 are constantly rotating, helps to accomplish such even fluid dispensing results.

The rotating branch 66 keeps the constantly agitated char-bed of biomass in a loose condition because it might otherwise tend to cake and reduce the reaction rate. The branch 66 also supplies additional air to increase the char bed temperature and prolong the chemical reaction which produces carbon monoxide. However, best results may not be possible if the bed tends to rotate as a homogeneous mass; therefore, such tendency is overcome by the provision of the retarder rods 68, assuring a constant pulling of the fluid through the continuously rotating dispersal system and providing both accurate and even mixing with the biomass fuel. The reaction is such as to break down the char, crack the tars and oils and allow the oxygen and the carbon to further react to enhance or enrich the gas, such gas being constantly pulled through the char-bed by the fan 72.

Perhaps the most important feature of the continuous generator 10 is the layer 54 and the step in the process which it provides. Gas and char proceed through such conversion kinetics systems consisting of the rotating grate or holding platform 50 on which is provided the high temperature balls of the layer 54. The kinetic movement of the balls provides a very active, random movement, producing a live bed therewithin, and by such movement, the gas and char are evenly pulled into the gas suction fan 72. The movement of the balls of the layer 54 causes the spent char and the small amount of ash to be quickly removed from the bottom of the char bed.

Notable is the fact that the pipe 36 is not restrained for rotation about an exact vertical axis but that, instead it can and does, to a limited extent of course, undergo some lateral movement within the limits of movement (other than rotational) of the grate 50 as confined by the section 14. This, to some possible extent, improves the actions and desired effects of the elements 70 and the branches 62, 64 and 66. But more importantly, the balls of the layer 54 are constantly joggled because of the vibrational effect thereon; and, not to be overlooked is the frictional, rubbing movement of the hot balls along the inner face of the section 14, causing the balls to tumble, shift and roll about in and out on the grate 50 during rotation of the grate 50 and the layer 54 at a rate, for example, of but one revolution each six minutes. Manufacturing tolerances are not maintained and the inner face of the section 14 is not perfectly cylindrical, all of which causes and enhances the filtering of the charcoal particles into the anti-plugging bed 54 for further reactive results therewithin.

The fan 72 pulls a negative pressure to maintain an even gas production rate while providing a positive pressure at the fan exit 78. The pressureized gas then moves through a cyclone system to remove particulates down to approximately 15 microns. The clean gas may then be further filtered, if desired, cooled and placed in industrial use. All movement in the system is synchronized and the gas production may be varied to suit the output desired.

The amount of ash actually pulled from beneath the grate 50 for flow into the inlet 76 is quite minimal (depending, of course, upon the nature of the biomass being used) because of the reactions produced by the use and movement of the balls within the layer 54, the result being a high quality gas having a heat quantity (BTU) as high as 200 per cubic feet or better.

After long periods of use, no slag or clinker residue above the grate 50 is found and much of the time most rocks and metals within the biomass have also disintegrated in the reaction zones or reduced fine enough to pass through the grate 50.

The nature, size and shape of the generally round balls of the layer 54 may vary although diameters of $\frac{1}{2}''$ to 2" are quite satisfactory with the slots 52 being, for example, approximately $\frac{3}{8}'' \times 1''$ in size or at least small enough not to pass the balls of the layer 54, while at the same time not impede the flow of gas and char. Stainless steel is suggested as one possibility if obtainable without undue cost, but from an expense standpoint, use of balls having a 90 to 89 percent aluminum content might be preferred. Also contemplated is the use of balls coated with any heavy, ductile, malleable metal which fuses with difficulty, such as platinum.

In summary, the reaction supporting fluid pulled downwardly into the open top 20, as well as into pipe 36, flows readily through the materials stirred by the elements 70, and is dispersed evenly throughout the char-bed by the branches 62, 64 and 66 inasmuch as the char-bed is kept loose by the branch 66. Hence, there is no reaction slow-down because of fluid starvation or because of caking or clinkering as the result of the heat.

The action causes break-up of the char-bed into small particles but such break-up is more the result of the action of the balls under the char-bed, the balls functioning, therefore, only as a moving sieve. This causes the particles and fines to gravitate from the char-bed and sift or filter into the constantly moving layer 54 such that the particles disintegrate rather quickly, well supported by an adequate supply of the fluid being pulled into the layer 54.

The balls of the layer 54 constantly act frictionally on the lower face of the char-bed to cause the break-up and induce gravitation of the partially reacted particles. Also, because the balls are kept in a loose condition, the particles readily sift into the layer 54 and are not only kept in motion, but are further broken up by the continuous movement of the balls within the layer 54.

The ball movement is not limited to the rotation of the layer 54. The particles therewithin are constantly riled also by the fact that ball movement takes place as the periphery of the layer 54 frictionally engages the inner wall of the section 14 during rotation of the layer 54. Still further, inasmuch as the pipe 36 rotates unsteadily, the platform 50, and therefore, the layer 54, tend to wobble and vibrate. The pipe 36 is unrestrained by bearings, sleeves or collars and its fit within the collar 42, as well as the fit of the stub 48 in the plug 38 is loose and sloppy.

All in all then, the balls roll, joggle, vibrate and become otherwise constantly displaced on the platform 50 and within the layer 54 such that a very high degree of disintegration takes place to a point of properly removing the spent (cool) char and fine ash which pass with the generated gas into the fan 72. The result is a high speed, substantially complete conversion of a wide variety of biomass into a relatively clean, high quality gas, with the conversion kinetics system, coupled with the downdraft, negative pressure input system, successfully contributing to the solution of the heretofore unsolved problems generally existing in prior biomass gasification processes and equipment.

The related co-pending application also discloses an embodiment as shown by FIGS. 5-7, wherein a gasifier 100 includes a hollow gas generator which has an inside diameter of about $23\frac{1}{4}$ inches and provided with an upper tubular section 112 and a lower tubular section 114 integral therewith. The section 112 has an opening 120 in its top disposed about 7 feet above ground level, and the section 14 is closed by an upper plate 122 of a hollow base 124 resting on a pair of beams 126. The insulation 28, sand 30, insulation 32, and sand 34 may be provided, if desired, the same as is shown in FIGS. 1, 3 and 4.

The opening 120 of the section 112 is adapted to receive a supply of biomass materials (not shown) from an inclined chute 135 emptying into a receiver 137 which communicates with the opening 120 thereabove. The materials are confined in a column by the section 112, and an elongated upright (preferably vertical) downdraft, 3 inch air supply pipe 136 in the generator 100 (preferably coaxial therewith) is normally open to the atmosphere at its uppermost end above the biomass materials in the generator 100. The pipe 136 rests, somewhat unrestrained, in a pocket 142 formed in the plate 122.

The pipe 136 is rotated by a prime mover 143 coupled with a gear box 146 that is, in turn connected with the pipe 136 at its upper end through a chain and sprocket wheel assembly 147.

A grate 150, in the nature of a circular, plate-like, holding platform, provided with a multitude of openings such as slots 152, surrounds the pipe 136, spaced above the plate 122, and is secured to the pipe 136 for rotation therewith, the diameter of the grate 150 being less than the inside diameter of the section 114. A 1½ to 6 inch layer of loose, high heat resistant, discrete, ball-like (preferably circular) elements, such as aluminum oxide, covers the grate 150. Resting on the layer 154 is a charcoal bed (not shown) of the biomass materials reaction in the section 14. The level of such bed normally reaches no higher than as is shown at 56 in FIG. 1, depending on the nature of the materials being converted to gas, and many other conditions and circumstances. The diameter of each of the balls in the layer 154 should range about ½ to 1 inch.

Means for directing combustion-supporting air or other fluid from the atmosphere into the charcoal bed includes upper and lower assemblies 158 and 160 of tubular tuyeres, all communicating with and secured to the pipe 136 within the generator 100. The upper assembly 158 includes a set of spaced tuyeres 162 and the lower assembly 160 includes a set of shorter, spaced apart tuyeres 164 surrounding the pipe 136. All of the tuyeres 162 and 164 extend downwardly and outwardly at an angle from the pipe 136 and all of the tuyeres 162 and 164 discharge onto the level of the charcoal bed or therebelow, but above the layer 154. A row of circumferentially spaced, horizontal, air discharge tuyeres 166 secured to the pipe 136 within the charcoal bed communicate with and extend radially of the pipe 136 between the tuyeres 164 and the layer 154. The tuyeres 166 are preferably spaced below the tuyeres 162 and 164 approximately ½ to 1¼ inches.

All of the tuyeres 162, 164 and 166 are rotatable with the pipe 136, and each has a small, leading blade 167 rigid thereto at its lower end for augmenting the second function of the tuyeres 162, 164 and 166 in the constant stirring of the charcoal bed during continuous rotation of the pipe 136 while the generator 10 is in operation. The blades 167 operate to create a multiplicity of combustion chambers within the charcoal bed.

A plurality of non-rotating circumferentially spaced, radial rods 168 are secured to the section 114 within the charcoal bed to prevent or retard rotation of such bed by the rotating layer 154. The rods 168 may be spaced from 1 to 4 inches below the tuyeres 164 and be either on the "at rest" level of the layer 154 or spaced ½ inch thereabove.

In order to distribute the char and prevent its build-up, a number of circumferentially spaced, radial members 169 are secured to the pipe 136 for rotation therewith at about 2 to 9½ inches below the grate 150 and about 1 to 2 inches above the plate 122 which is in turn about 6 to 14 inches above ground level.

A number of stirring elements 170 for the biomass materials in the section 112 are arranged at different heights and are secured to the pipe 136, radiating therefrom for rotation therewith. The elements 170 prevent bridging of such materials, and each is provided with a downwardly and outwardly inclined, terminal length 171.

As in FIGS. 1-3, there is provided an exhaust fan 172 having an input shaft 174, an inlet 176 and an outlet (not shown) adapted for communication with a cyclone separator. A closure 180, which may be held open by a solenoid 182 or the like, closes the upper end of the pipe 136 automatically for safety purposes during shut down.

The operation of the embodiment of FIGS. 5-7 is essentially the same as that of the embodiment shown in FIGS. 1-4 above explained.

The instant invention is depicted in FIGS. 8-14, wherein a gasifier 200 includes a hollow, somewhat cylindrical gas and charcoal generator of substantially similar construction to the gasifiers 10, 100 of FIGS. 1-4 and 5-7 as above explained. A lower section 214 of the gasifier 200 is supported by a four legged base 224. The upper section 12, the top opening 20, the insulation 28, 32 and the sand 30, 34 may be provided, if desired, the same as is shown in FIGS. 1, 3 and 4.

The lower section 214 is adapted to receive a continuous supply of biomass materials and air for conversion into charcoal and a combustible gas. An elongated upright, down draft air supply pipe 236 in the generator 200 is preferably vertical and coaxial with the lower section 214, and is normally open to the atmosphere at its uppermost end (not shown). The pipe 236 is free to rotate within a collar 242 and is supported by a plate 222 connected to the lowermost end of the section 214. Additionally, the pipe 236 is rotated by a prime mover (not shown) which may be constructed as shown in the embodiment of FIG. 5.

A flat grate 250 for supporting the reactants has a generally circular horizontal cross section and a plurality of apertures or slots 252 adapted to sift charcoal particles 253 from the lumps 251 of charcoal in the reacting biomass. The grate 250 is spaced above the plate 222 and is secured to the pipe 236 for rotation therewith. Preferably, the slots have a dimension of 1¾" by ⅜" and are defined by sharp uppermost edges which tend to scrape off the particles 253 from the lumps 251.

A flat, wall-reinforcing ring 255 is fixed to the inner wall of the lower section 114 such that an operational clearance 262 is provided between the grate 250 and the ring 255 having a width of approximately ±1/64". As shown in FIG. 14, the ring 255 is firmly secured to the lower section 214 by a pair of welds 257 holding the section 214 substantially circular in the zone thereof which surrounds the grate 250. The remainder of the section 214 above the grate 250 is preferably left in a non-uniform, warped condition to enhance the agitation of the materials therein. The proximal upper edges of the grate 250 and the ring 255 are sufficiently sharp to shear off the particles 253 from the lumps 251.

A fan (not shown) communicates with an air inlet 276 to pull a negative pressure on the generator 200 and draw air into the reacting biomass. Combustion air is also drawn into the char-bed through a series of spaced tuyeres (not shown) which communicate with the rotating hollow pipe 236, similar to the tuyeres 162, 164 and 166 as is shown in FIG. 5. Other aspects of the gasifier 200 may be substantially similar to the details of construction shown in FIGS. 1-7.

A plurality of stationary circumferentially spaced rods 268 are secured to the lower section 214 for retarding rotation of the reacting biomass and charcoal lumps 253. Each horizontal rod 268 is supported exteriorly of the lower section 214 by an outwardly inclined brace 269 (FIG. 8) and an outwardly inclined brace 271 (FIGS. 9 and 10). Braces 269 assist in preventing rods 268 from downward deflection toward the grate 250 in response to the weight of the materials thereabove, and the braces 271 assist in precluding deflection of the rods 268 in the direction of rotation of the grate 250. Preferably, the vertical clearance between the rods 268 and the upper surface of the grate 250 is ⅛".

The stationary rods 268, in addition to retarding the rotation of the reacting biomass on the grate 250, are operable to force portions 253 of the charcoal lumps 251 downwardly through the slots 252 and the clearance 262. As shown in FIG. 11, the rods 268, in conjunction with the rotating grate 250, are also operable to present a shearing force on the charcoal lumps 251 to partially break up and reduce the size of the latter. The sharp edges of the slots 252, the periphery of the grate 250 and the ring 255 and the relatively soft nature of the charcoal lumps 251 contribute to the disintegration of the latter. Of course, once the charcoal lump 251 is crumbled to a sufficiently small size, it will pass through the slots 252, into the hollow chamber below the grate 250 and above the plate 222, for ultimate withdrawal through the inlet 276. The gas and charcoal pass through the fan 172 and thence into a cyclone separator (not shown).

In FIG. 12, an alternate form of rods 268a have a rectangular transverse configuration. In FIG. 13, yet another form of rods 268b have a triangular transverse configuration. The leading edges of the rods 268a, 268b as thus presented tend to contribute to the shearing action to scrape, break and somewhat crumble the charcoal lumps 251 as the latter are moved by the grate 250. However. as soon as the charcoal is reduced in size sufficiently to be forced through the slots 252 and the clearance 262, the particles 253 fall into the collection chamber below the grate 250 and further pyrolysis ceases.

In FIGS. 8 and 9, the rods 268 are disposed radially of the grate 250 and of the lower section 214. However, in FIG. 10, the rods 268 are shown oblique or non-radial to the lower section 214. The oblique positioning of the rod 268 tends to force the charcoal toward the center of the gasifier 200, such that better reaction kinetics is accomplished.

The rates of gas and charcoal production are highly dependent upon the rotational speed of the grate 250. By way of example, when the grate 250 makes a complete revolution in 17 minutes, the final product thus obtained has a heating value of about 9,000 BTUs. However, when the grate 250 rotates at a speed of one revolution per 1½ minutes, the final product has a heating value of about 4.5 million BTUs. The higher rotational speeds produce more gas and more charcoal because of substantially increased combustion efficiency.

The body of materials in the zone of pyrolytic reaction is constantly and effectively stirred and agitated during rotation of the grate 250 as the result of the presence of the rods 268, 268a or 268b extending into such materials, continuously breaking up the solid mass, which would otherwise form, into the smaller charcoal lumps 251, thereby presenting an increased totality of surface areas contacted by the air and reducing blockage of air flow through such mass. The breakup results are also effected by the presence of the tuyeres 166 and their blades 167 in the mass of reacting materials. Therefore, the increased air flow from the tuyeres 162, 164 and 166 is forced into direct contact with the multitudes of surfaces presented by the broken up charcoal lumps 251, the combined effects being increased combustion efficiency as aforesaid.

Noteworthy also is the fact that the diposition of the ring 255 forces the downwardly moving air in the generator 200 along a circuitous path away from the inner wall surface of the lower section 214 at the ring 255 and into the reacting biomass. Consequently, the heat loss through the section 214 adjacent the reacting biomass is substantially reduced to the point where the outer operational surface temperature of the section 214 is relatively low. Additionally, the ring 255 greatly strengthens the lower section 214 and forces the latter into near perfect circularity such that the clearance 262 between the ring 255 and the grate 250 is maintained precisely uniform entirely around the grate 250.

As is shown in FIG. 9, as the reacting biomass moves radially inwardly, a tar and charcoal cake 275 is formed on the outer surface of the pipe 236 during operation of the gasifier 200. The cake 275 advantageously coats the pipe 236 and insulates the latter such that the need for a heavy, expensive, heat resistant shaft or pipe is eliminated. In FIG. 10, the pipe 236 is shown in its new, uncaked state.

I claim:

1. A gasifier for continuous conversion of biomass into charcoal and combustible gas, said gasifier comprising:

a hollow generator having an open top for receiving a continuous supply of said biomass and continuous, unimpeded gravitation of the biomass in the generator;

a generally horizontal, flat, slotted grate mounted in said generator and occupying substantially the entire cross-section of said hollow generator for rotation about an essentially upright axis and disposed to receive said biomass thereupon, presenting a char-bed of said biomass on the grate when the biomass is subjected to pyrolysis adjacent the grate;

a downdraft air supply pipe extending vertically downwardly into and through through the biomass in the generator and provided with tubular tuyeres in the generator disposed to force a continuous supply of combustion-supporting air into and through said char-bed adequate to provide a high exothermic reaction rate and combustion efficiency and production of charcoal on the grate from said biomass;

a plurality of stationary members connected to the generator above the grate and extending into the char-bed for retarding rotation thereof and breaking the charcoal into separate lumps against the surfaces of which the air impinges, said members being proximal to the grate for shearing the lumps against the slots of the grate to disintegrate the lumps into charcoal particles, and forcing the particles downwardly through the slots and substantially reducing the residence time of the char-bed in the generator; and means for withdrawing said particles and said gas generated during pyrolysis from the generator beneath the grate.

2. The invention of claim 1, said slots having lump-shearing edges.

3. The invention of claim 1, said generator having an internal ring disposed to deflect the air inwardly toward the char-bed.

4. The invention of claim 3, the ring surrounding the grate and having a clearance around the grate through which said members force the particles.

5. The invention of claim 4, the ring and the grate being circular and relatively concentric, the ring being secured rigidly to the generator for holding the latter cylindrical in the zone of char-bed pyrolysis.

6. The invention of claim 4, said slots and said ring having lump-shearing edges.

7. The invention of claim 6, the ring and the grate being circular and relatively concentric, the ring being secured rigidly to the generator for holding the latter cylindrical in the zone of the char-bed pyrolysis.

8. The invention of claim 1, said members being transversely circular rods, circumferentially spaced and disposed radially with respect to the generator and said axis.

9. The invention of claim 1, said members having lump-shearing edges facing downwardly toward the grate.

10. The invention of claim 1, said members being circumferentially spaced and disposed at a tangent to the generator and the grate.

11. The invention of claim 1, said air supply pipe being upright, rotatable and grate-supporting, said tuyeres extending into the char-bed for agitating the char-bed and directing the air against said surfaces.

12. The invention claim 11, each tuyere having a char-bed stirring blade.

13. The invention of claim 12, there being a suction fan having an inlet communicating with the generator below the grate for simultaneously drawing ambient air into the pipe, through the tuyeres, lumps and slots, and darwing the gas and particles through the slots.

* * * * *